US009478183B2

(12) United States Patent
Kuwabara

(10) Patent No.: US 9,478,183 B2
(45) Date of Patent: Oct. 25, 2016

(54) DISPLAY DEVICE AND DISPLAY METHOD

(75) Inventor: Nobuhiro Kuwabara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 509 days.

(21) Appl. No.: 14/005,164

(22) PCT Filed: Apr. 9, 2012

(86) PCT No.: PCT/JP2012/059639
§ 371 (c)(1),
(2), (4) Date: Sep. 13, 2013

(87) PCT Pub. No.: WO2012/141120
PCT Pub. Date: Oct. 18, 2012

(65) Prior Publication Data

US 2014/0002432 A1 Jan. 2, 2014

(30) Foreign Application Priority Data

Apr. 15, 2011 (JP) ................................ 2011-090714

(51) Int. Cl.
*G06F 3/038* (2013.01)
*G09G 3/36* (2006.01)

(52) U.S. Cl.
CPC .......... *G09G 3/3614* (2013.01); *G09G 3/3648* (2013.01); *G09G 2300/0876* (2013.01); *G09G 2310/0248* (2013.01); *G09G 2310/08* (2013.01)

(58) Field of Classification Search
CPC ............. G09G 3/3614; G09G 3/3648; G09G 2300/0876; G09G 2310/0248; G09G 2310/083
USPC ........................................... 345/98, 209–215
See application file for complete search history.

(56) References Cited

U.S. PATENT DOCUMENTS

| | | | | |
|---|---|---|---|---|
| 6,297,793 | B1 | 10/2001 | Kawahata | |
| 6,677,925 | B1 | 1/2004 | Kawaguchi et al. | |
| 2003/0080934 | A1* | 5/2003 | Ishiyama | G09G 3/3655 345/100 |
| 2003/0174113 | A1* | 9/2003 | Herrmann | G09G 3/3614 345/96 |
| 2004/0041763 | A1 | 3/2004 | Kodama et al. | |
| 2004/0119075 | A1 | 6/2004 | Murade | |
| 2006/0022929 | A1 | 2/2006 | Hashimoto et al. | |
| 2006/0092114 | A1 | 5/2006 | Izumikawa et al. | |
| 2007/0194211 | A1 | 8/2007 | Nagasawa | |

FOREIGN PATENT DOCUMENTS

| | | |
|---|---|---|
| JP | 11-030975 A | 2/1999 |
| JP | 11-202835 A | 7/1999 |

(Continued)

OTHER PUBLICATIONS

Official Communication issued in International Patent Application No. PCT/JP2012/059639, mailed on Jul. 3, 2012.

*Primary Examiner* — Kent Chang
*Assistant Examiner* — Mark Edwards
(74) *Attorney, Agent, or Firm* — Keating & Bennett, LLP

(57) ABSTRACT

In this liquid crystal display device, a potential propagation line (PVID) and video signal lines SL(1) to SL(M) are connected via coupling capacitive elements Cp(1) to Cp(M), and a capacitance drive circuit (100) causes the potential of the potential propagation line (PVID) to change in the same direction in which the potential of a video signal S(m) varies during a period of nonselection. As a result, even if there is not enough time to perform a precharge operation, the potentials of video signal lines can be similarly raised or lowered without performing a precharge operation.

5 Claims, 11 Drawing Sheets

(56) References Cited

FOREIGN PATENT DOCUMENTS

| | | | | |
|---|---|---|---|---|
| JP | 11-271801 | A | | 10/1999 |
| JP | 11271801 | A | * | 10/1999 |
| JP | 2001-147420 | A | | 5/2001 |
| JP | 2004-125887 | A | | 4/2004 |
| JP | 2006-039337 | A | | 2/2006 |
| JP | 2006-126471 | A | | 5/2006 |
| JP | 2007-256909 | A | | 10/2007 |
| JP | 2008-008942 | A | | 1/2008 |

* cited by examiner

PRIOR ART

PRIOR ART

DISPLAY DEVICE AND DISPLAY METHOD

TECHNICAL FIELD

The present invention relates to display devices such as an active-matrix liquid crystal display device.

BACKGROUND ART

To reliably write image data, some conventional active-matrix liquid crystal display devices perform a precharge operation in which predetermined potentials are applied to video signal lines immediately before data writing. The configuration and operation of such a liquid crystal display device will be described below.

FIG. 11 is a block diagram illustrating the overall configuration of a conventional active-matrix liquid crystal display device that performs a precharge operation. This liquid crystal display device includes a display control circuit 200, a source driver (video signal line drive circuit) 300, a gate driver (scanning signal line drive circuit) 400, a display portion 500, and precharge switching elements SW(1) to SW(M).

The display portion 500 includes a plurality (M) of video signal lines SL(1) to SL(M), a plurality (N) of scanning signal lines GL(1) to GL(N), a plurality (N) of auxiliary capacitance lines CsL(1) to CsL(N), and a plurality (M×N) of pixel forming portions provided along the video signal lines SL(1) to SL(M) and the scanning signal lines GL(1) to GL(N).

The display control circuit 200 receives a display data signal DAT and a timing control signal TS, which are both externally transmitted, and outputs digital image signals DV, along with a source start pulse signal SSP, a source clock signal SCK, a latch strobe signal LS, a gate start pulse signal GSP, a gate clock signal GCK, and a precharge control signal PC, which are for use in controlling the timing of displaying an image on the display portion 500.

The source driver 300 receives the digital image signals DV, the source start pulse signal SSP, the source clock signal SCK, and the latch strobe signal LS outputted by the display control circuit 200, and applies drive video signals S(1) to S(M) to the video signal lines SL(1) to SL(M) in order to charge pixel capacitances in the pixel forming portions in the display portion 500. At this time, the source driver 300 sequentially holds the digital image signals DV, which indicate voltages to be applied to the video signal lines SL(1) to SL(M), at times of pulse generation by the source clock signal SCK. Thereafter, the digital image signals DV being held are converted into analog voltages at times of pulse generation by the latch strobe signal LS.

On the basis of the gate start pulse signal GSP and the gate clock signal GCK outputted by the display control circuit 200, the gate driver 400 sequentially applies active scanning signals G(1) to G(N) to the scanning signal lines GL(1) to GL(N).

In this manner, in the display portion 500, the digital image signals DV from the source driver 300 are applied to the video signal lines SL(1) to SL(M) as the drive video signals S(1) to S(M), and the scanning signals G(1) to G(N) from the gate driver 400 are applied to the scanning signal lines GL(1) to GL(N), respectively. As a result, voltages in accordance with the drive video signals S(1) to S(M) are held in the pixel capacitances of the display portion 500, and voltages equivalent to potential differences between pixel electrodes and a common electrode are applied to a liquid crystal layer in accordance with the voltages being held. With these voltages applied, the display portion 500 controls the optical transmittance of the liquid crystal layer, so that the image represented by the digital image signals DV received from an external signal source is displayed.

Here, recent advancement of high-resolution display panels demands drive video signals to be charged in pixel capacitances in a shorter period of time, and in some cases, there might be not enough time to complete the charging. Therefore, to appropriately charge the pixel capacitances in a short period of time, an operation (called a precharge operation) in which video signal lines (and, where necessary, pixel capacitances) are precharged by applying a predetermined potential (e.g., a common electrode potential or such like) might be performed prior to application of drive video signals. This will be described below with reference to FIG. 12.

FIG. 12 is a waveform chart of various signals for the conventional liquid crystal display device that performs a precharge operation. Here, alternating-current drive is required in order to prevent deterioration of the liquid crystal layer over time, and therefore, this liquid crystal display device employs a so-called line inversion drive method in which the voltage that is applied to the liquid crystal of the pixel forming portion is reversed in polarity every row and also every frame, and in this case, a common potential Vcom is set as a mid-point voltage (in the variation range) of the video signal. As a result, the potential of the pixel electrode can be converted to alternating-current potential with respect to the potential of the common electrode.

Furthermore, as shown in FIG. 12, a period tp of nonselection is provided between the fall of a scanning signal G(n) and the rise of the next scanning signal G(n+1), and during this period, the precharge control signal PC is turned on. Consequently, as can be appreciated with reference to FIG. 11, a precharge potential PV (e.g., a mid-point voltage) is applied to each of the video signal lines SL(1) to SL(M).

Note that for simplification of the description, the drive video signals S(1) to S(M) are shown in FIG. 12 as not being changed in potential for the period tp, but in actuality, the source driver 300 stops outputting the drive video signals S(1) to S(M), thereby rendering its contacts with the video signal lines SL(1) to SL(M) into the state of high impedance.

In such a state, by performing the precharge operation, the potentials of the video signal lines SL(1) to SL(M) are raised or lowered to voltages (e.g., a mid-point voltage) in accordance with the polarities of the drive video signals S(1) to S(M) to be applied next. As a result, the following pixel capacitance charging can be completed in a short period of time.

Note that in relevance to the present invention, the following prior art documents are known. First, Japanese Laid-Open Patent Publication No. 2001-147420 describes the configuration of a liquid crystal display device in which, to prevent horizontal shadow, a detection bus line which crosses all data lines is provided to detect the sum of outputs from the data lines and adjust a common potential. Second, Japanese Laid-Open Patent Publication No. 11-30975 describes the configuration of a liquid crystal display device in which, to shorten the period of charging/discharging source lines, all of the source lines are short-circuited to a common potential at the beginning of the writing to liquid crystal capacitance. Third, Japanese Laid-Open Patent Publication No. 11-202835 describes the configuration of a liquid crystal display device provided with a circuit for applying an auxiliary voltage prior to application of an inverted output voltage during dot inversion drive. Fourth, Japanese Laid-Open Patent Publication No. 11-271801 describes the configuration of a liquid crystal display device in which all video signal lines are connected to capacitive elements via switches, so that charge provided to the video signal lines is partially stored, and the switches are opened and closed to supply charge to the video signal lines before the next charging. Fifth, Japanese Laid-Open Patent Publication No. 2004-125887 describes the configuration of a liquid crystal display device having a noise suppression wire to which a fixed potential is provided, and also having a capacitor provided between the wire and each data signal line. Sixth, Japanese Laid-Open Patent Publication No. 2006-39337 describes the configuration of a liquid crystal display device in which capacitors to be connected to data lines are interchanged with each other during dot inversion drive in accordance with the polarity of an image signal. Seventh, Japanese Laid-Open Patent Publication No. 2006-126471 describes the configuration of a liquid crystal display device in which a gradation voltage is generated in a predetermined period, and no gradation voltage is generated in other periods. Eighth, Japanese Laid-Open Patent Publication No. 2007-256909 describes the configuration of a liquid crystal display device in which capacitive elements of different capacitance values are provided to data lines in order to reduce uneven luminances. Ninth, Japanese Laid-Open Patent Publication No. 2008-8942 describes the configuration of a liquid crystal display device in which a coupling capacitance having the same laminated structure as a pixel capacitance is provided to each data line in order to reduce uneven luminances as above and also achieve compact size.

CITATION LIST

Patent Document

Patent Document 1: Japanese Laid-Open Patent Publication No. 2001-147420

Patent Document 2: Japanese Laid-Open Patent Publication No. 11-30975

Patent Document 3: Japanese Laid-Open Patent Publication No. 11-202835

Patent Document 4: Japanese Laid-Open Patent Publication No. 11-271801

Patent Document 5: Japanese Laid-Open Patent Publication No. 2004-125887

Patent Document 6: Japanese Laid-Open Patent Publication No. 2006-39337

Patent Document 7: Japanese Laid-Open Patent Publication No. 2006-126471

Patent Document 8: Japanese Laid-Open Patent Publication No. 2007-256909

Patent Document 9: Japanese Laid-Open Patent Publication No. 2008-8942

SUMMARY OF THE INVENTION

Problems to be Solved by the Invention

Here, the conventional liquid crystal display device that performs a precharge operation as shown in FIGS. 11 and 12 is advanced in terms of its high-resolution capability, and only a short period of time can be allocated for a single precharge operation. As a result, in some cases, the precharge operation might fail to appropriately raise or lower the potentials of the video signal lines SL(1) to SL(M).

Therefore, the present invention has been made to solve the problem as mentioned above, and an objective of the present invention is to provide an active-matrix display device capable of reliably writing image data even when there is not enough time to perform a precharge operation.

Solution to the Problems

A first aspect of the present invention is directed to an active-matrix display device with a plurality of pixel forming portions for forming an image to be displayed, a plurality of video signal lines for transmitting a plurality of video signals representing the image to be displayed to the pixel forming portions, and a plurality of scanning signal lines crossing the video signal lines, the pixel forming portions being arranged in a matrix so as to correspond to the video signal lines and the scanning signal lines, the device including:

a scanning signal line drive circuit for selectively driving the scanning signal lines;

a video signal line drive circuit for applying video signals to the video signal lines by which the signals are to be transmitted, with their polarities being inverted every predetermined unit of period;

a plurality of coupling capacitances connected at their first ends to the video signal lines respectively; and a capacitance drive circuit for changing potentials at second ends of the coupling capacitances that are opposite to the first ends connected to the video signal lines respectively, in the same directions in which potentials of the video signal lines change when the video signals are transmitted.

In a second aspect of the present invention, based on the first aspect of the invention, the video signal line drive circuit applies the video signals to the video signal lines respectively such that the video signals transmitted by the video signal lines are equal in polarity during any period in which any one of the scanning signal lines is selected, and the capacitance drive circuit changes the potentials at the second ends of the coupling capacitances in the same direction.

In a third aspect of the present invention, based on the first aspect of the invention, the video signal line drive circuit applies the video signals to the video signal lines respectively such that video signals transmitted by any two adjacent video signal lines differ in polarity during any period in which any one of the scanning signal lines is selected, and the capacitance drive circuit causes potentials at the second ends of coupling capacitances connected to the two adjacent video signal lines respectively to change in different directions respectively in correlation with the connected video signal lines.

In a fourth aspect of the present invention, based on the first aspect of the invention, the video signal line drive circuit is switchable between first and second drive modes, and applies the video signals to the video signal lines respectively such that, in the first drive mode, video signals transmitted by any two adjacent video signal lines differ in polarity during any period in which any one of the scanning signal lines is selected, and in the second drive mode, video signals transmitted by any two adjacent pairs of adjacent video signal lines differ in polarity during any period in which any one of the scanning signal lines is selected, and the capacitance drive circuit is switchable between a third drive mode corresponding to the first drive mode and a fourth drive mode corresponding to the second drive mode, such that, in the third drive mode, potentials at the second ends of the coupling capacitances connected to the two adjacent video signal lines respectively change indifferent directions respectively in correlation with the connected video signal lines, and in the fourth drive mode, potentials at the second ends of the coupling capacitances connected to the two adjacent pairs of video signal lines respectively change in different directions respectively in correlation with the connected video signal lines.

In a fifth aspect of the present invention, based on the first aspect of the invention, the coupling capacitances are connected near the both ends of the video signal lines.

A sixth aspect of the present invention is directed to a display method for an active-matrix display device with a plurality of pixel forming portions for forming an image to be displayed, a plurality of video signal lines for transmitting a plurality of video signals representing the image to be displayed to the pixel forming portions, a plurality of scanning signal lines crossing the video signal lines, and a plurality of coupling capacitances connected at their first ends to the video signal lines respectively, the pixel forming portions being arranged in a matrix so as to correspond to the video signal lines and the scanning signal lines, the method including:

a scanning signal line drive step of selectively driving the scanning signal lines;

a video signal line drive step of applying video signals to the video signal lines by which the signals are to be transmitted, with their polarities being inverted every predetermined unit of period; and a capacitance drive step of changing potentials at second ends of the coupling capacitances that are opposite to the first ends connected to the video signal lines respectively, in the same directions in which potentials of the video signal lines change when the video signals are transmitted.

Effect of the Invention

According to the first aspect of the present invention, the capacitance drive circuit changes the potentials at the second ends of the coupling capacitances that are opposite to the first ends connected to the video signal lines respectively, in the same directions in which the potentials of the video signal lines change when the video signals are transmitted, and therefore, even when there is not enough time to perform a precharge operation, the potentials of the video signal lines can be similarly raised or lowered without performing a precharge operation, so that the potentials of the video signal lines can be caused to approximate to their prescribed potentials in a short period of time. Moreover, unlike in a precharge operation, the video signal lines are not charged, so that power consumption in this regard can be reduced. Furthermore, since TFTs for use in performing a precharge operation can be omitted from switching elements, production cost can be reduced, and reduction in yield rate due to failure of TFTs can be suppressed. In addition, by using the coupling capacitances, it is rendered possible to achieve a liquid crystal panel with a narrow frame area and low power consumption.

According to the second aspect of the present invention, the video signal line drive circuit performs so-called line inversion drive, so that the capacitance drive circuit changes the potentials at the second ends of the coupling capacitances in the same direction, which allows a simplified drive mode, and typically, the second ends of the coupling capacitances can be coupled to the capacitance drive circuit by a single line (potential propagation line), which allows a simplified configuration.

According to the third aspect of the present invention, the video signal line drive circuit performs so-called dot inversion drive, so that the capacitance drive circuit causes potentials at the second ends of coupling capacitances connected to any two adjacent video signal lines to change in different directions in correlation with the connected video signal lines, and therefore, the drive load on the video signal line drive circuit can be reduced even in a drive mode that requires the video signal line drive circuit to have a high drive capability.

According to the fourth aspect of the present invention, the video signal line drive circuit is switchable between so-called dot inversion drive and two-dot inversion drive, so that the capacitance drive circuit causes potentials at the second ends of coupling capacitances connected to video signal lines to appropriately change in accordance with the connected video signal lines, and therefore, even in such a device configuration in which drive modes are switchable as above, the drive load on the video signal line drive circuit can be lightened.

According to the fifth aspect of the present invention, the coupling capacitances are connected near the opposite ends of the video signal lines, and therefore, the potentials of the video signal lines can be caused to approximate to their prescribed potentials in a shorter period of time than in the case where they are driven at one end.

The sixth aspect of the present invention makes it possible for a display method to achieve a similar effect to that achieved by the display device to which the first aspect of the present invention is directed.

MODES FOR CARRYING OUT THE INVENTION

Hereinafter, embodiments of the present invention will be described with reference to the accompanying drawings.

<1. First Embodiment>

<1.1 Overall Configuration and Operation of the Liquid Crystal Display Device>

Figure 1:
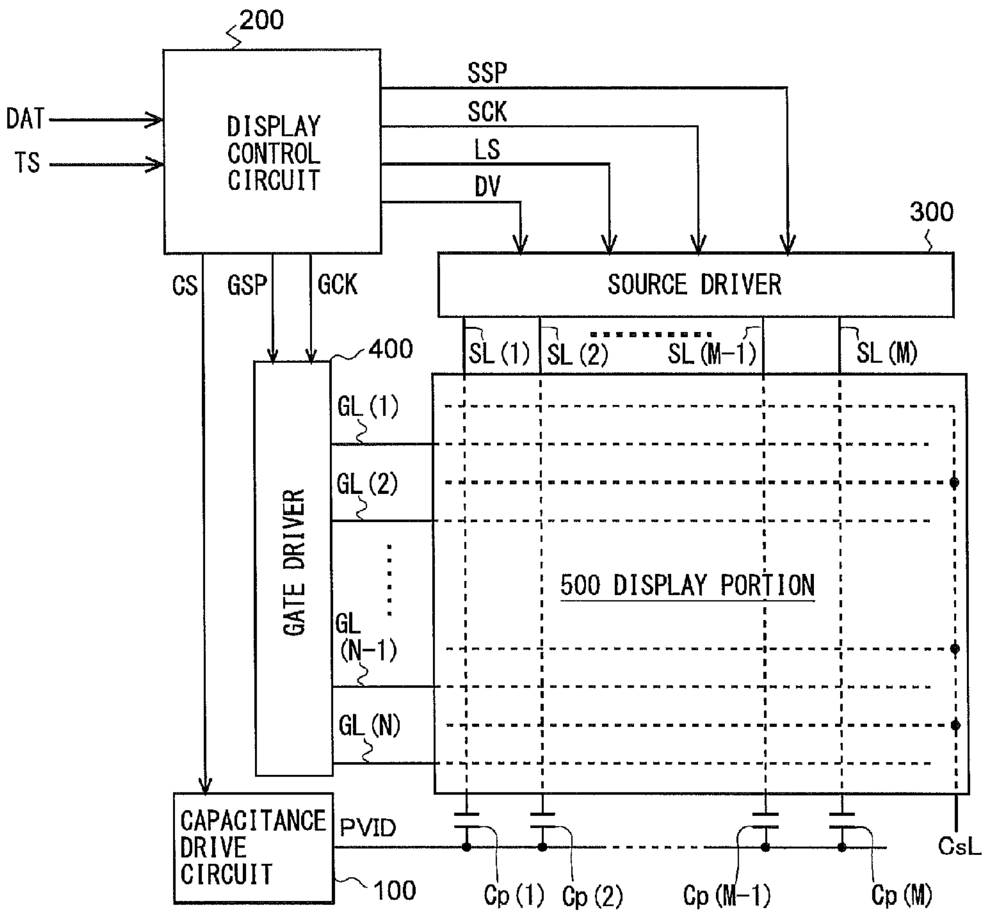
FIG. 1 is a block diagram illustrating a configuration example of a liquid crystal display device according to a first embodiment of the present invention.

FIG. 1 is a block diagram illustrating the overall configuration of an active-matrix liquid crystal display device according to a first embodiment of the present invention. This liquid crystal display device includes a display control circuit 200, a source driver (video signal line drive circuit) 300, a gate driver (scanning signal line drive circuit) 400, a display portion 500, and a capacitance drive circuit 100.

The display portion 500 is of a homeotropic alignment type and is configured so as to be normally black, and the drive method employed is a so-called line inversion drive method in which the voltage that is applied to the liquid crystal of the pixel forming portion is reversed in polarity every row and also every frame.

Figure 11:
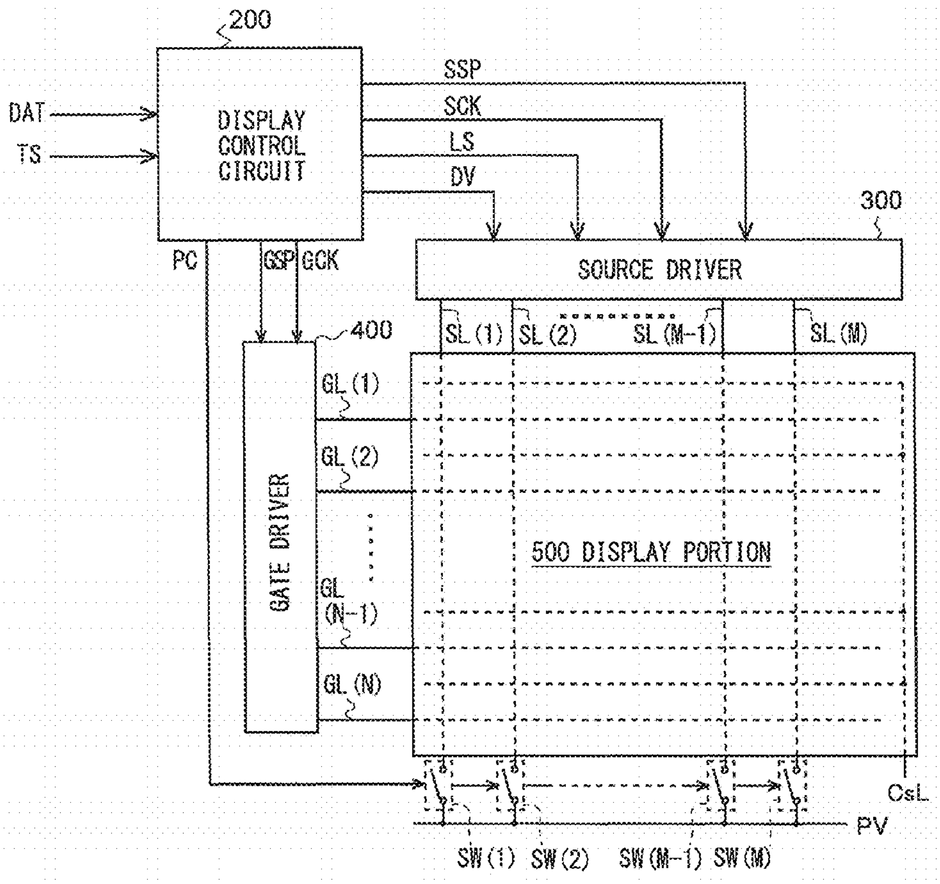
FIG. 11 is a block diagram illustrating a configuration example of a conventional liquid crystal display device.
Figure 12:
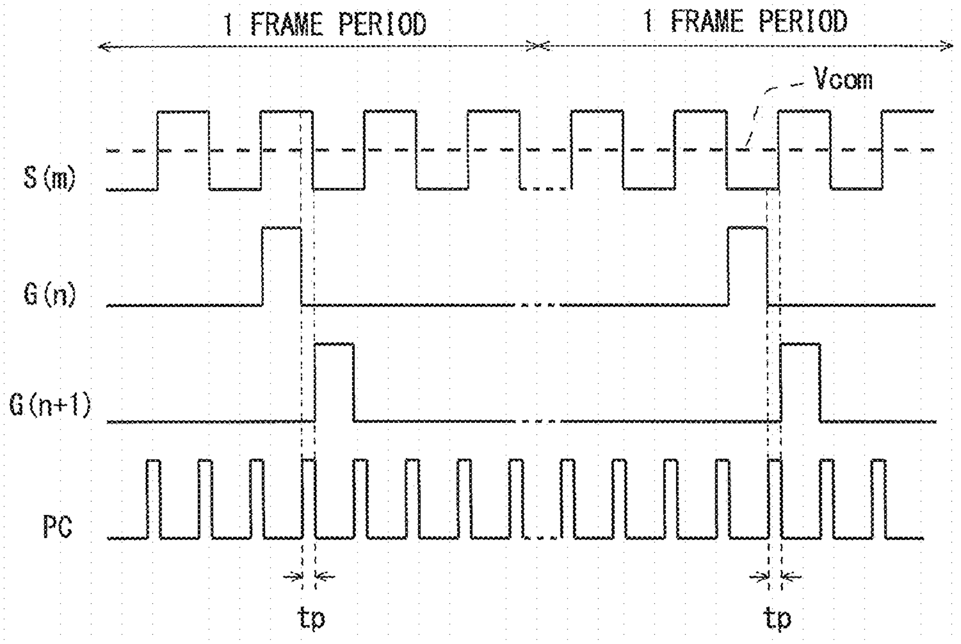
FIG. 12 is a waveform chart of various signals for the conventional liquid crystal display device.

Furthermore, as with the conventional liquid crystal display device shown in FIG. 11, the display portion 500 includes a plurality (M) of video signal lines SL(1) to SL(M), a plurality (N) of scanning signal lines GL(1) to GL(N), a plurality (N) of auxiliary capacitance lines CsL(1) to CsL(N), and a plurality (M×N) of pixel forming portions provided along the video signal lines SL(1) to SL(M) and the scanning signal lines GL(1) to GL(N). Note that the pixel forming portion that is provided near the intersection of the scanning signal line GL(n) and the video signal line SL(m) in association therewith will be denoted below by reference characters "P(n,m)" where n is a natural number of N or less, and m is a natural number of M or less.

Figure 2:
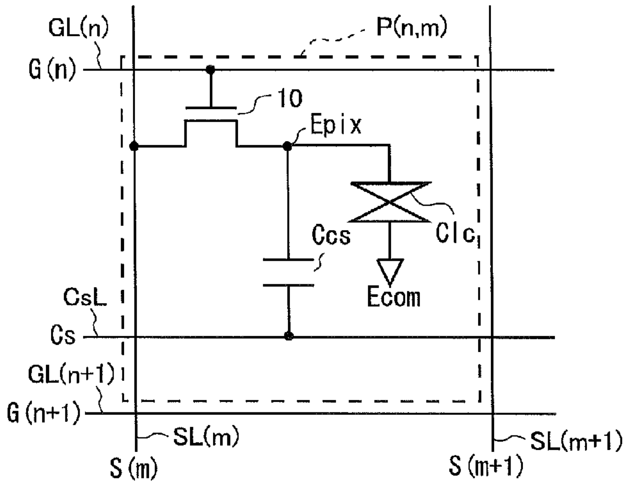
FIG. 2 is a circuit diagram illustrating an equivalent circuit of a pixel forming portion in the embodiment.

FIG. 2 illustrates an equivalent circuit of a pixel forming portion P(n,m) in the display portion 500 of the present embodiment. As shown in FIG. 2, each pixel forming portion P(n,m) consists of a TFT 10, which is a switching element connected at a gate terminal to the scanning signal line GL(n) and at a source terminal to the video signal line SL(m) that passes the intersection, a pixel electrode Epix connected to a drain terminal of the TFT 10, a common electrode Ecom provided commonly for the pixel forming portions P(n,m) (where n=1 to N, and m=1 to M), and a liquid crystal layer, which is an electro-optic element provided commonly for the pixel forming portions P(n,m) between the pixel electrode Epix and the common electrode Ecom.

Note that each pixel forming portion P(n,m) displays red (R), green (G), or blue (B), and the pixel forming portions P(n,m) that display the same color are arranged along the same video signal lines from among SL(1) to SL(M), with their order along the scanning signal lines GL(1) to GL(N) being R, G, B.

Each pixel forming portion P(n,m) has liquid crystal capacitances (also referred to as "pixel capacitances") Clc formed by the pixel electrode Epix and the common electrode Ecom, which is opposed thereto with respect to the liquid crystal layer. Two video signal lines SL(m) and SL(m+1) are arranged with the pixel electrode Epix positioned therebetween, and the video signal line SL(m) is connected to the pixel electrode Epix via the TFT 10.

Furthermore, the auxiliary capacitance line CsL(n) is formed parallel to the scanning signal line GL(n), and the pixel forming portion P(n,m) has an auxiliary capacitance Ccs formed between the pixel electrode Epix and the auxiliary capacitance line CsL(n).

The display control circuit 200 receives a display data signal DAT and a timing control signal TS, which are both externally transmitted, and outputs digital image signals DV, along with a source start pulse signal SSP, a source clock signal SCK, a latch strobe signal LS, a gate start pulse signal GSP, a gate clock signal GCK, and a capacitance potential control signal CS to be described later, which are for use in controlling the timing of displaying an image on the display portion 500.

The source driver 300 receives the digital image signals DV, the source start pulse signal SSP, the source clock signal SCK, and the latch strobe signal LS outputted by the display control circuit 200, and applies drive video signals S(1) to S(M) to the video signal lines SL(1) to SL(M) in order to charge the pixel capacitances Clc (and the auxiliary capacitances Ccs) in the pixel forming portions P(n,m) in the display portion 500. At this time, the source driver 300 sequentially holds the digital image signals DV, which indicate voltages to be applied to the video signal lines SL(1) to SL(M), at times of pulse generation by the source clock signal SCK. Thereafter, the digital image signals DV being held are converted into analog voltages at times of pulse generation by the latch strobe signal LS.

Note that such D/A conversion is performed by the D/A conversion circuit (and a gradation voltage generation circuit) included in the source driver 300. The D/A conversion circuit generates analog voltages corresponding to display gradation levels, for example, by dividing a reference voltage, which is externally provided by the source driver 300 for the purpose of generating gradation voltages. The D/A conversion circuit generates the analog voltages simultaneously with the timing as described above, so that the analog voltages are applied simultaneously to the video signal lines SL(1) to SL(M) as drive video signals. That is, the present embodiment employs a line-sequential drive method to drive the video signal lines SL(1) to SL(M). Note that a dot-sequential drive method in which video signals are sequentially provided to the video signal lines may be employed.

On the basis of the gate start pulse signal GSP and the gate clock signal GCK outputted by the display control circuit 200, the gate driver 400 applies active scanning signals G(1) to G(N) sequentially to the scanning signal lines GL(1) to GL(N).

During the period in which one of the scanning signals G(1) to G(N) is active (referred to below as a "period of selection"), the TFT of a corresponding pixel forming portion is kept on, and the voltage value of a video signal is applied to the pixel capacitance via a corresponding video signal line, so that the voltage value is held during a non-active period (referred to below as a "period of nonselection").

In this manner, drive video signals are applied to the video signal lines SL(1) to SL(M), and scanning signals are applied to the scanning signal lines GL(1) to GL(N), whereby an image is displayed on the display portion 500. Note that the common electrode Ecom is kept at a common potential Vcom by a predetermined voltage supplied from an unillustrated power circuit.

Figure 3:
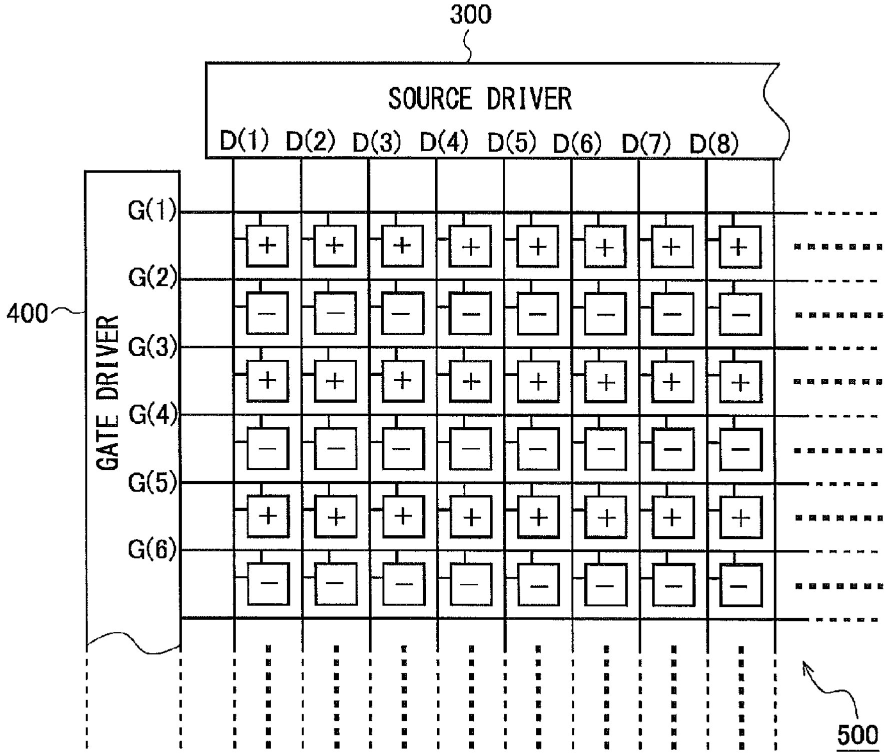
FIG. 3 is a diagram describing the distribution of pixel electrode polarities in the embodiment.

Furthermore, as a result of the line inversion drive being performed as described above, the pixel electrodes Epix of the pixel forming portions P(n,m) have their potentials inverted in polarity in units of one row as shown in FIG. 3, with respect to the potential of the common electrode Ecom.

Furthermore, in the present embodiment, the capacitance drive circuit 100, which achieves a potential change as in a precharge operation without performing a precharge operation, is provided and receives a capacitance potential control signal CS from the display control circuit 200, thereby driving a potential propagation line PVID. The potential propagation line PVID is connected through coupling capacitive elements Cp(1) to Cp(M) to the ends of the video signal lines SL(1) to SL(M) that are opposite to the ends coupled to the source driver 300. In the present embodiment, the potential of the potential propagation line PVID is caused to vary, resulting in potential variations on the video signal lines SL(1) to SL(M) as in the precharge operation. This operation will be described below with reference to FIG. 4.

<1.2 Waveforms of Various Signals>

Figure 4:
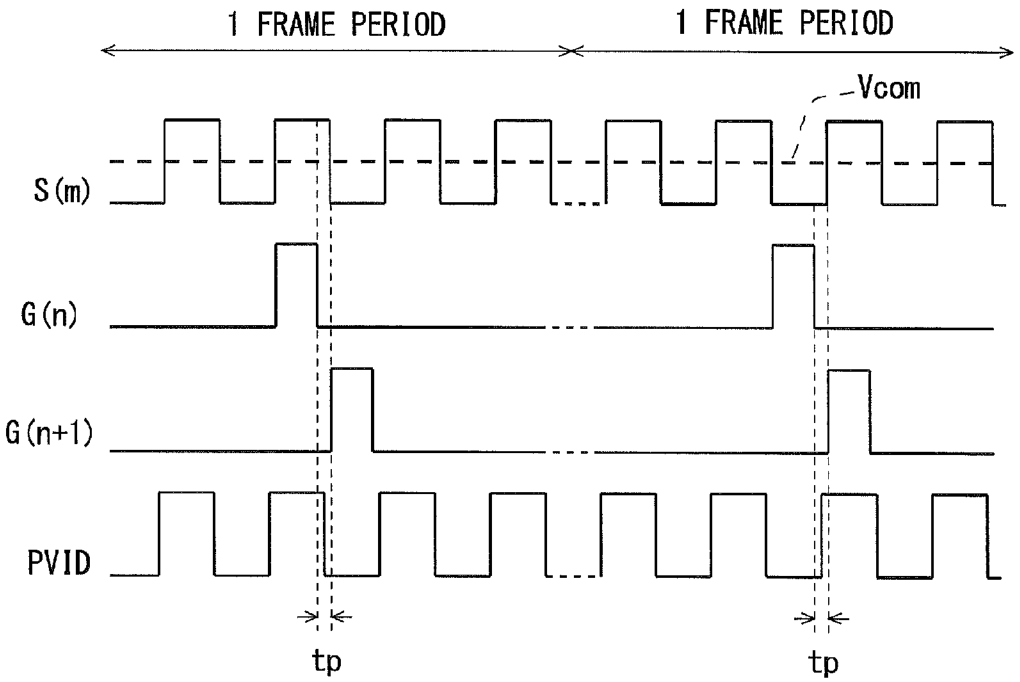
FIG. 4 is a waveform chart of various signals in the embodiment.

FIG. 4 is a waveform chart of various signals for the present liquid crystal display device. As shown in FIG. 4, a video signal S(m), which is a voltage signal applied to a video signal line SL(m), has a predetermined voltage value in accordance with the grayscale value (luminance) of a pixel, i.e., a voltage value within the grayscale range from black (lowest luminance) to white (highest luminance).

Note that it is necessary to perform alternating-current drive in order to prevent the liquid crystal layer from deteriorating over time, as described earlier, and therefore, when the common potential Vcom is constant, the common potential Vcom is set at a mid-point voltage (in the variation range) of the video signal. The reason for this is that the potential of the pixel electrode can be converted into an alternating-current potential with respect to the potential of the common electrode. However, a line inversion drive method in which the common electrode is driven so as to be in opposite phase to the video signal may be employed. As a result, the load on the source driver 300 can be lessened (or its circuit withstand voltage can be reduced). Moreover, it is also possible to employ a line inversion drive method in which polarity inversion occurs per unit period of two or more frames, although the polarity inversion cycle is lengthened.

Here, as shown in FIG. 4, a potential propagation signal (denoted below by the same characters "PVID" as the potential propagation line for transmitting the signal) changes, i.e., either rises or falls, in the same direction in which the potential of the video signal S(m) changes during a period tp of nonselection from the fall of a scanning signal G(n) to the rise of the next scanning signal G(n+1).

Accordingly, potential variations of the potential propagation signal PVID do not cause potential changes of the pixel electrodes in the pixel forming portions P(n,m) and P(n+1,m), but the potentials of the video signal lines SL(1) to SL(M) coupled to the potential propagation line PVID change in accordance with the capacitance ratios of the coupling capacitive elements Cp(1) to Cp(M) to the video signal lines SL(1) to SL(M) serially connected thereto. Note that FIG. 4 shows the amount of change in the potential of the potential propagation signal PVID as if it were the same as the amount of change in the potential of the video signal S(m), but in actuality, these amounts of change are different and they are determined on the basis of the capacitance ratios of the coupling capacitive elements Cp(1) to Cp(M) to the video signal lines SL(1) to SL(M) and other factors.

For example, the potential of the video signal S(m) falls after a lapse of a period tp within the first frame period shown in FIG. 4, and rises after a lapse of a period tp within the second frame period. For the period tp, potential variance of the potential propagation signal PVID does not cause any changes in the pixel potentials as mentioned earlier, because no pixel capacitances are charged (here, no charge transfer occurs), but potential variations of the video signal lines SL(1) to SL(M) occur without involving the charging (charge transfer). Here, there is parasitic capacitance between the video signal lines SL(1) to SL(M) and other conductors (such as wires and electrodes), and such parasitic capacitance of the video signal lines has a value about 50 times the pixel capacitance. Accordingly, a high drive load is applied on the source driver 300. Therefore, by changing the potential of the potential propagation line PVID in the same direction in which the potential of the video signal S(m) varies, the drive load on the source driver 300 (after a lapse of a period tp) is lessened, so that the potential of the video signal line SL(m) can approximate to the potential of the video signal S(m) in a short period of time. This effect can be said to be the same as the effect of changing potentials in the precharge operation, but unlike in the precharge operation, video signal lines are not charged, and the potentials of the video signal lines SL(1) to SL(M) are simply changed by means of the driving by the capacitance drive circuit 100 via the coupling capacitive elements Cp(1) to Cp(M). Therefore, power consumption in this regard can be reduced. Note that in the present embodiment, by driving the potential propagation line PVID during a period tp of nonselection, as shown in FIG. 4, the video signal lines SL(1) to SL(M) are changed in their potentials, but the potential propagation line PVID may be driven during a period of selection by shortening or omitting the period tp. However, it is more preferable not to drive the potential propagation line PVID while the source driver 300 is applying a video signal.

Furthermore, in the present embodiment, unlike in the precharge operation, predetermined potentials are not applied to the video signal lines SL(1) to SL(M) through charging, and therefore (the voltage values of) the video signals applied by the source driver 300 are not interfered with. Accordingly, during the period tp and also other periods, it is not necessary for switching elements or the like to disconnect the video signal lines SL(1) to SL(M) from the coupling capacitive elements Cp(1) to Cp(M) or the potential propagation line PVID. In this manner, the present embodiment allows TFTs to be omitted from the switching elements, so that production cost can be reduced and reduction in yield rate due to failure of TFTs can be suppressed.

Furthermore, in general, the coupling capacitive elements Cp(1) to Cp(M) can be formed smaller than TFTs, and therefore, the present embodiment makes it possible to achieve a liquid crystal panel with a narrow frame area, and also makes it possible to achieve lower power consumption in the entire device since power is not consumed as much as in the case where TFTs are used.

<1.3 Effects of the First Embodiment>

As described above, in the present embodiment, the potential propagation line PVID and the video signal lines SL(1) to SL(M) are connected via the coupling capacitive elements Cp(1) to Cp(M), and the potential of the potential propagation line PVID is changed in the same direction in which the potential of the video signal S(m) varies, so that even when there is not enough time to perform a precharge operation, the potential of the video signal line can be similarly raised or lowered without performing a precharge operation, and the potential of the video signal line can be caused to approximate to a prescribed potential of the video signal in a short period of time. Moreover, unlike in a precharge operation, the video signal lines are not charged, so that power consumption in this regard can be reduced. Furthermore, in the present embodiment, since TFTs for use in performing a precharge operation can be omitted from switching elements, production cost can be reduced, and reduction in yield rate due to failure of TFTs can be suppressed. In addition, by using the coupling capacitive elements Cp(1) to Cp(M), it is rendered possible to achieve a liquid crystal panel with a narrow frame area and low power consumption.

<2. Second Embodiment>

<2.1 Configuration and Operation of the Liquid Crystal Display Device>

Figure 5:
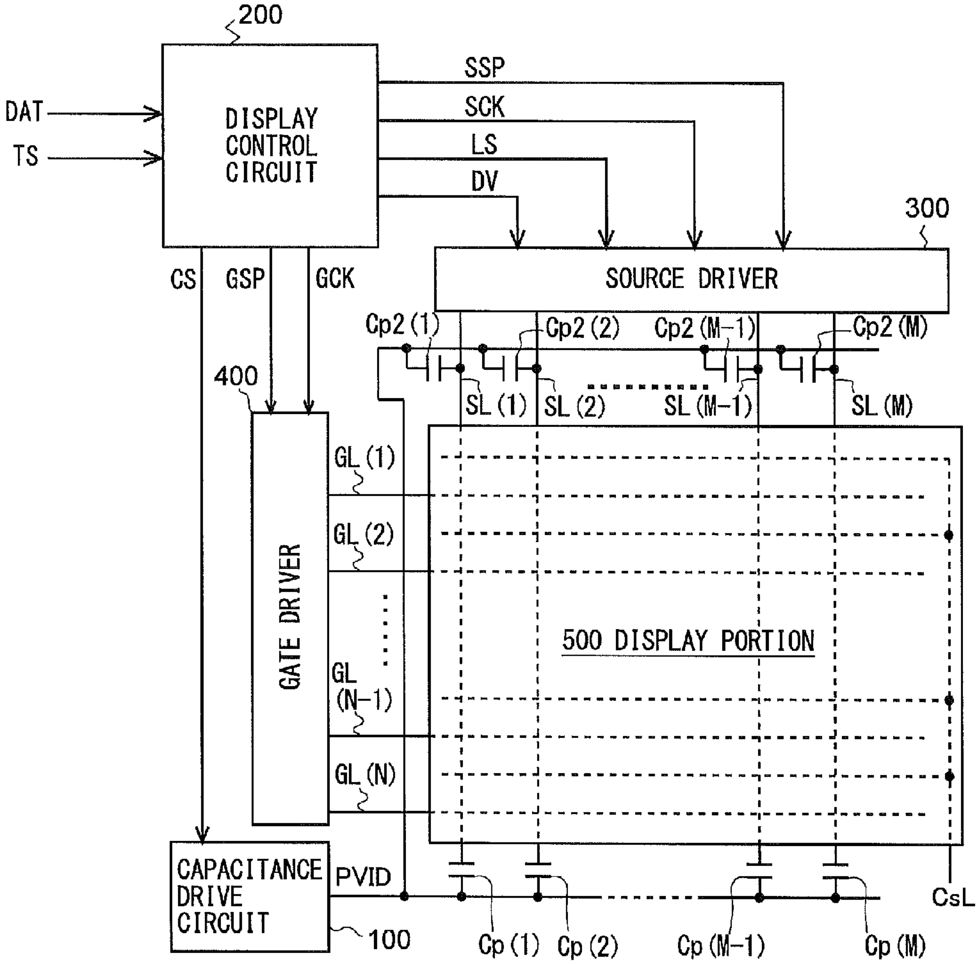
FIG. 5 is a block diagram illustrating a configuration example of a liquid crystal display device according to a second embodiment of the present invention.

FIG. 5 is a block diagram illustrating the overall configuration of an active-matrix liquid crystal display device according to a second embodiment of the present invention. This liquid crystal display device includes a display control circuit 200, a source driver (video signal line drive circuit) 300, a gate driver (scanning signal line drive circuit) 400, a display portion 500, a capacitance drive circuit 100, and coupling capacitive elements Cp(1) to Cp(M), all of which are the same as in the first embodiment, but there is a difference from the first embodiment in that second coupling capacitive elements Cp2(1) to Cp2(M) are further provided. The same components as those of the first embodiment are denoted by the same reference characters, therefore any descriptions thereof will be omitted, and only the second coupling capacitive elements Cp2(1) to Cp2(M) will be described.

The second coupling capacitive elements Cp2(1) to Cp2 (M) are connected at one end to the ends of the video signal lines SL(1) to SL(M) that are opposite to the ends connected to the coupling capacitive elements Cp(1) to Cp(M), as shown in FIG. 5, and the second coupling capacitive elements Cp2(1) to Cp2(M) are connected at the other end to the potential propagation line PVID. The waveform chart of various signals shown in FIG. 4, including potential variations of the potential propagation line PVID, can be applied here as well, and therefore, by changing the potential of the potential propagation line PVID in the same direction in which the potential of the video signal S(m) varies, the video signal line SL(m) is driven at both ends, so that the (entire) potential of the video signal line SL(m) can be caused to approximate to the potential of the video signal S(m) in a shorter period of time than in the first embodiment. Note that coupling capacitances may be provided in place of or in combination with the first and second coupling capacitances, such that they are connected to the video signal lines SL(1) to SL(M) at predetermined midpoints distanced from both ends of the lines. However, it is often the case that such wiring is difficult.

<2.2 Configuration of the Second Embodiment>

As described above, in the present embodiment, the potential propagation line PVID and the video signal lines SL(1) to SL(M) are connected via the coupling capacitive elements Cp(1) to Cp(M) and the second coupling capacitive elements Cp2(1) to Cp2(M), and the potential of the potential propagation line PVID is caused to change in the same direction in which the potential of the video signal S(m) varies, so that the potential of the video signal line can be caused to approximate to a prescribed potential of the video signal in a shorter period of time (than in the first embodiment). Moreover, as in the first embodiment, it is possible to achieve the effect of reducing power consumption, the effect of reducing production cost, the effect of suppressing reduction in yield rate caused by TFTs, and the effect of achieving a liquid crystal panel with a narrow frame area and low power consumption.

<3. Third Embodiment>

<3.1 Configuration and Operation of the Liquid Crystal Display Device>

Figure 6:
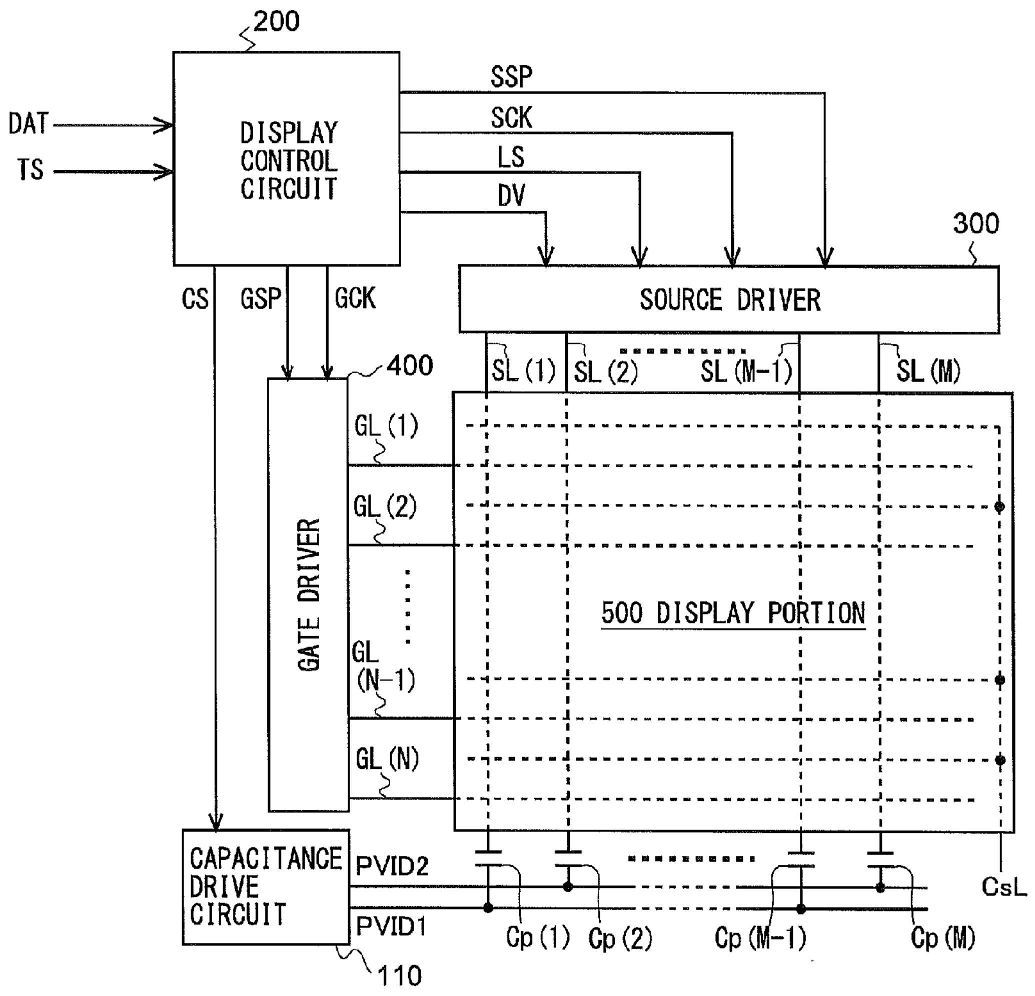
FIG. 6 is a block diagram illustrating a configuration example of a liquid crystal display device according to a third embodiment of the present invention.

FIG. 6 is a block diagram illustrating the overall configuration of an active-matrix liquid crystal display device according to a third embodiment of the present invention. This liquid crystal display device includes a display control circuit 200, a source driver (video signal line drive circuit) 300, a gate driver (scanning signal line drive circuit) 400, and a display portion 500, which are the same as in the first embodiment, in addition to a capacitance drive circuit 110, which operates in a different manner from that of the first embodiment. Moreover, the same coupling capacitive elements Cp(1) to Cp(M) as in the first embodiment are provided, but there is a difference from the first embodiment in that the coupling capacitive elements Cp(1) to Cp(M) are connected to either a first potential propagation line PVID1 or a second potential propagation line PVID2 alternatingly in order of arrangement, as shown in FIG. 6. In addition, instead of employing the line inversion drive method, the present embodiment employs a so-called dot inversion drive method in which the voltage of a video signal to be applied to the liquid crystal is inverted in polarity every video signal line and also every vertical scanning period. The same components as those of the first embodiment are denoted by the same reference characters, therefore any descriptions thereof will be omitted, and only the drive mode of the present liquid crystal display device and the operation of the capacitance drive circuit 110 will be described.

Figure 7:
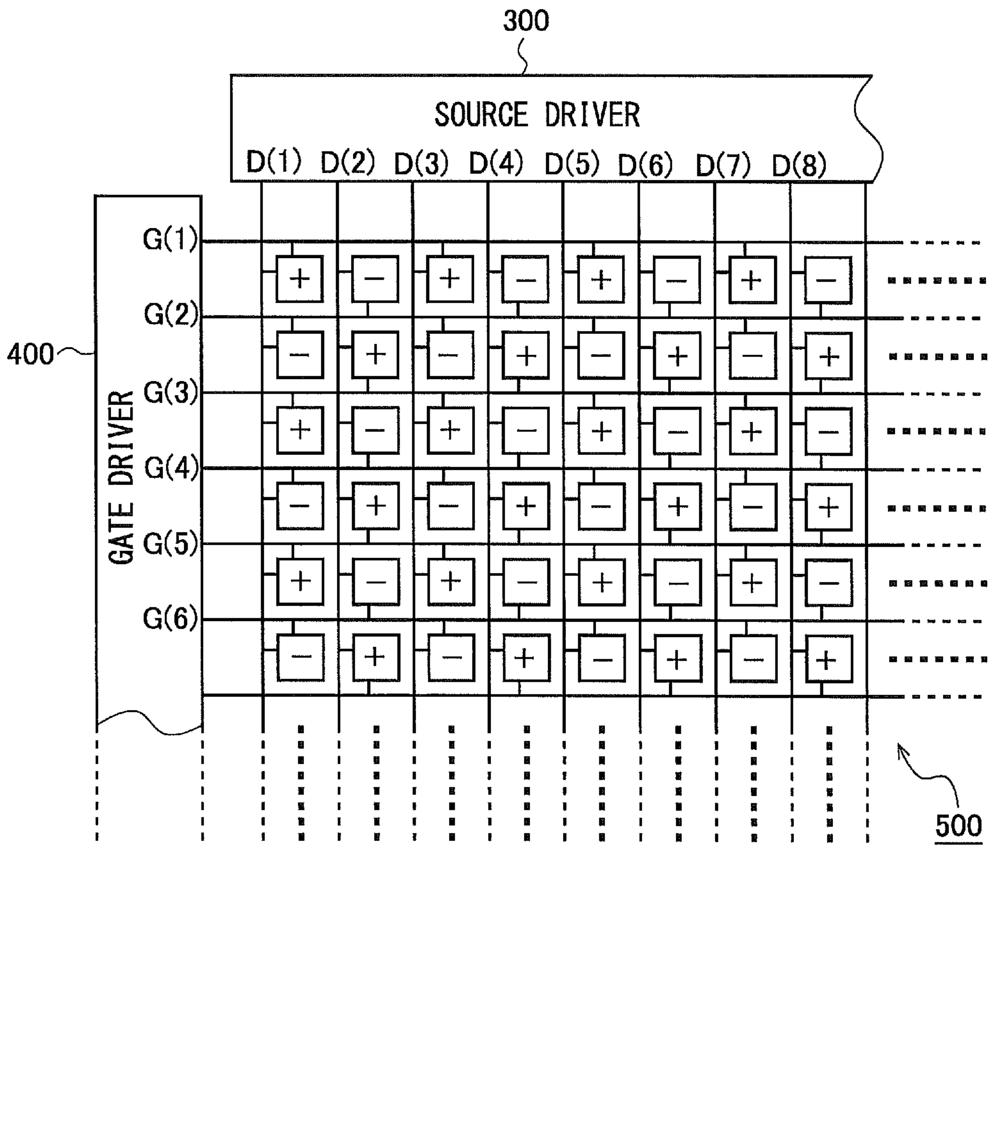
FIG. 7 is a diagram describing the distribution of pixel electrode polarities in the embodiment.

FIG. 7 is a diagram describing the polarity of the pixel electrode in each pixel forming portion. In the present embodiment, the pixel electrode potentials of adjacent pixel forming portions are opposite in polarity, as shown in FIG. 7, and from this, it can be appreciated that the dot inversion drive method is employed. As a result of the dot inversion drive method, the potential of the pixel electrode Epix in each pixel forming portion P(n,m) is inverted in polarity with respect to the potential of the common electrode Ecom, every column and every row, as shown in FIG. 7, and therefore, it is not possible to employ the configuration that can be employed in the first embodiment in which the drive load on the source driver 300 is lessened (or its circuit withstand voltage is reduced) by changing the common potential Vcom. Accordingly, there is more need to lessen the load on the source driver 300. Note that although the cycle of polarity inversion is lengthened, it is possible to employ a dot inversion drive method in which polarity inversion occurs every unit period of two or more frames.

Furthermore, in the configuration of the first embodiment, the polarity changes row by row, i.e., a video signal line SL(m) and a video signal line SL(m+1) adjacent thereto are different in polarity, and therefore, the potential of the potential propagation line PVID cannot be changed in the same directions in which the potentials of these video signal lines change. Therefore, the first potential propagation line PVID1 and the second potential propagation line PVID2 are provided as shown in FIG. 6, such that their potentials change in different directions, whereby the video signal line SL(m) and the video signal line SL(m+1) adjacent thereto change in polarity in different directions. This will be described in detail below with reference to FIG. 8.

<3.2 Waveforms of Various Signals>

Figure 8:
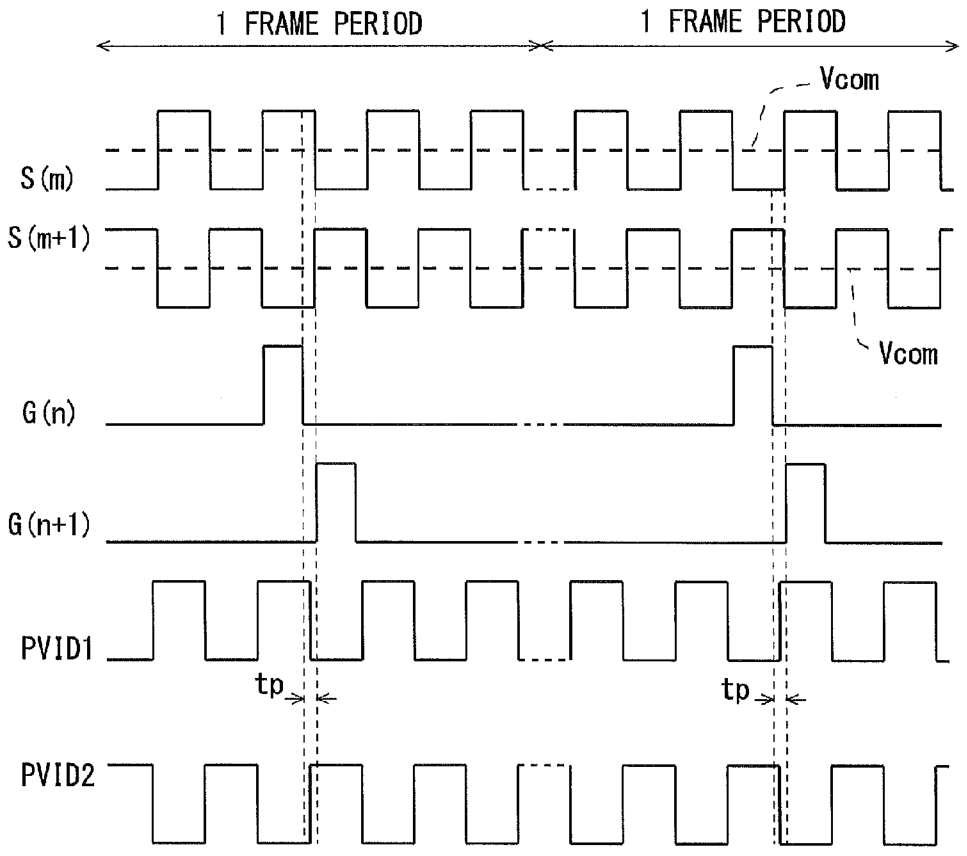
FIG. 8 is a waveform chart of various signals in the embodiment.

FIG. 8 is a waveform chart of various signals for the liquid crystal display device according to the third embodiment. The video signal S(m) and the scanning signals G(n) and G(n+1) shown in FIG. 8 are the same as those shown in FIG. 4, and the potential propagation signal transmitted by the potential propagation line PVID1 shown in FIG. 8 (denoted below by the same characters "PVID1" as the potential propagation line for transmitting the signal) has the same waveform as the potential propagation signal PVID shown in FIG. 4, but there is a difference from the first embodiment shown in FIG. 4 in that FIG. 8 additionally shows a video signal S(m+1), which is in opposite phase (opposite polarity) to the video signal S(m), and a potential propagation signal transmitted by the potential propagation line PVID2 (denoted below by the same characters “PVID2” as the potential propagation line for transmitting the signal), which is in opposite phase to the potential propagation signal PVID.

As described earlier, the present embodiment employs the dot inversion drive method, and therefore, the video signal S(m) and the video signal S(m+1) are opposite in polarity. Accordingly, the two potential propagation lines PVID1 and PVID2 are required; the potential propagation line PVID1 is connected to the video signal lines SL(1), SL(3), . . . , SL(m), . . . , and SL(M−1), and the potential propagation signal PVID2 is connected to the video signal lines SL(2), SL(4), . . . , SL(m+1), . . . , and SL(M), as shown in FIG. 6. The potential propagation signals PVID1 and PVID2 change, i.e., rise or fall, in the same directions in which the potentials of the video signals S(m) and S(m+1) change, during the period tp of nonselection.

Accordingly, potential variations of the potential propagation signals PVID1 and PVID2 do not cause any changes in the pixel electrode potentials of the pixel forming portions P(n,m) and P(n+1, m), but, for example, after a lapse of a period tp within the first frame period shown in FIG. 8, the potential of the video signal S(m) falls, and the potential of the video signal S(m+1) rises. During the period tp, no pixel capacitance is charged (here, no charge transfer occurs), as described earlier, and therefore, the pixel potentials do not change, but the potential variations of the video signal lines SL(1) to SL(M) occur without the charging (charge transfer).

Here, a high drive load is applied on the source driver 300, as described earlier, and therefore, the drive load on the source driver 300 after the lapse of a period tp is reduced by changing the potential of the potential propagation lines PVID in the same directions in which the potentials of the video signals S(m) and S(m+1) vary, thereby causing the potentials of the video signal lines SL(m) and SL(m+1) to approximate to the potentials of the video signals S(m) and S(m+1) in a short period of time. This effect can be said to be similar to the effect of changing potentials in a precharge operation, but unlike in the precharge operation, the video signal line is not charged, and the potentials of the video signal lines SL(1) to SL(M) are simply changed by means of the driving by the capacitance drive circuit 100 via the coupling capacitive elements Cp(1) to Cp(M). Therefore, as in the first embodiment, power consumption in this regard can be reduced.

<3.3 Effects of the Third Embodiment>

As described above, in the case where the present embodiment employs the dot inversion drive method, the potential propagation lines PVID1 and PVID2 and the video signal lines SL(1) to SL(M) are connected via the coupling capacitive elements Cp(1) to Cp(M), and the potentials of the potential propagation lines PVID1 and PVID2 are changed in the same directions in which the potentials of the video signals S(m) and S(m+1) vary, so that the potentials of the video signal lines can be caused to approximate to prescribed potentials of the video signals in a short period of time. Moreover, as in the first embodiment, it is possible to achieve the effect of reducing power consumption, the effect of reducing production cost, the effect of suppressing reduction in yield rate caused by TFTs, and the effect of achieving a liquid crystal panel with a narrow frame area and low power consumption. Note that the first embodiment does not require the two potential propagation lines PVID1 and PVID2 as required in the third embodiment, and therefore is advantageous in that the configuration and the drive mode can be more simplified.

<4. Fourth Embodiment>

<4.1 Configuration and Operation of the Liquid Crystal Display Device>

Figure 9:
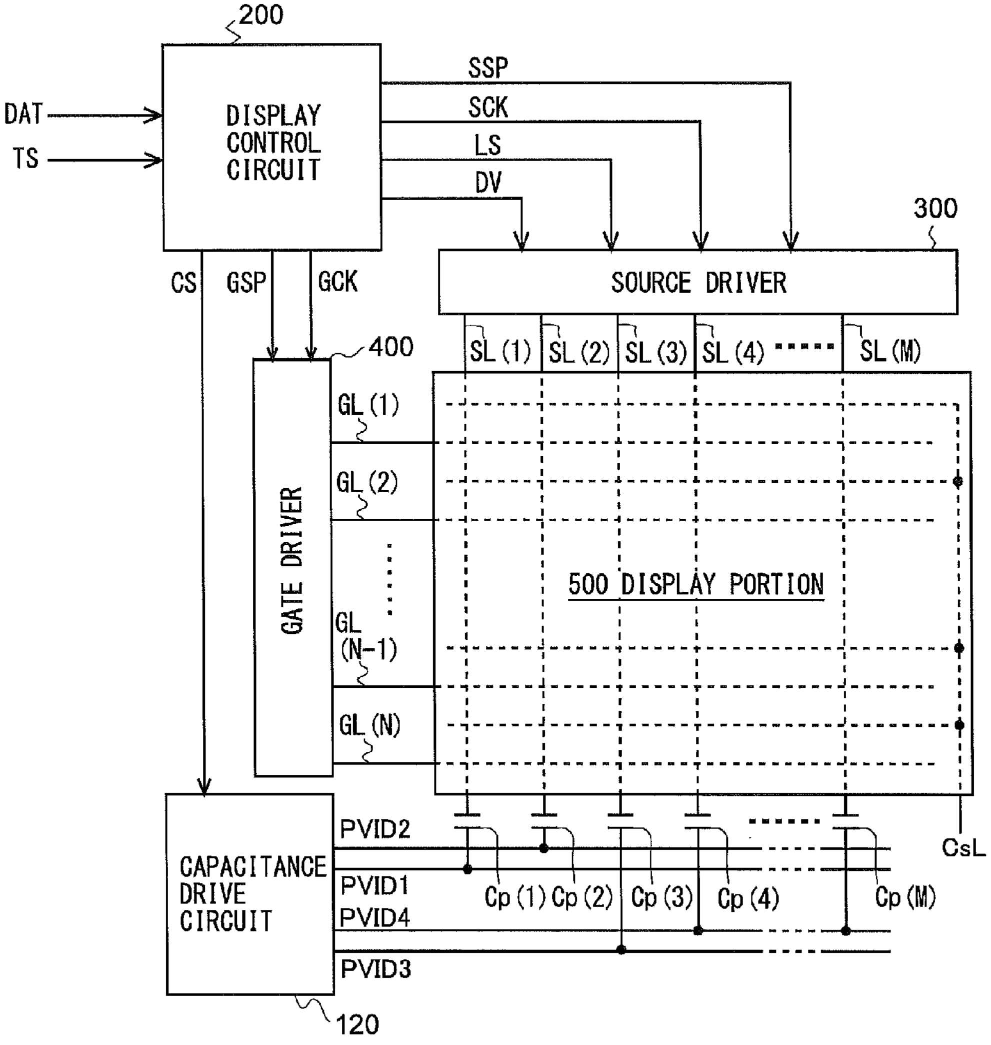
FIG. 9 is a block diagram illustrating a configuration example of a liquid crystal display device according to a fourth embodiment of the present invention.

FIG. 9 is a block diagram illustrating the overall configuration of an active-matrix liquid crystal display device according to a fourth embodiment of the present invention. This liquid crystal display device includes a display control circuit 200, a source driver (video signal line drive circuit) 300, a gate driver (scanning signal line drive circuit) 400, and a display portion 500, which are the same as those of the first embodiment, but it includes a capacitance drive circuit 120 that operates differently from those of the first through third embodiments.

Furthermore, the same coupling capacitive elements Cp(1) to Cp(M) as in the first or third embodiment are provided, but there is a difference from the third embodiment in that the coupling capacitive elements Cp(1) to Cp(M) are connected sequentially to one of the first through fourth potential propagation lines PVID1 to PVID4 in recurring patterns, as shown in FIG. 9.

Furthermore, the present embodiment employs and can be switched between the dot inversion drive method of the third embodiment and a so-called (one line/) two-dot inversion drive method in which the voltage of a video signal to be applied to the liquid crystal is inverted in polarity every second video signal line and also every vertical scanning period.

The same components as those of the third embodiment are denoted by the same reference characters, therefore any descriptions thereof will be omitted, and only the drive mode by the two-dot inversion drive method characteristic of the present liquid crystal display device and the operation of the capacitance drive circuit 120 will be described with reference to FIG. 10.

Figure 10:
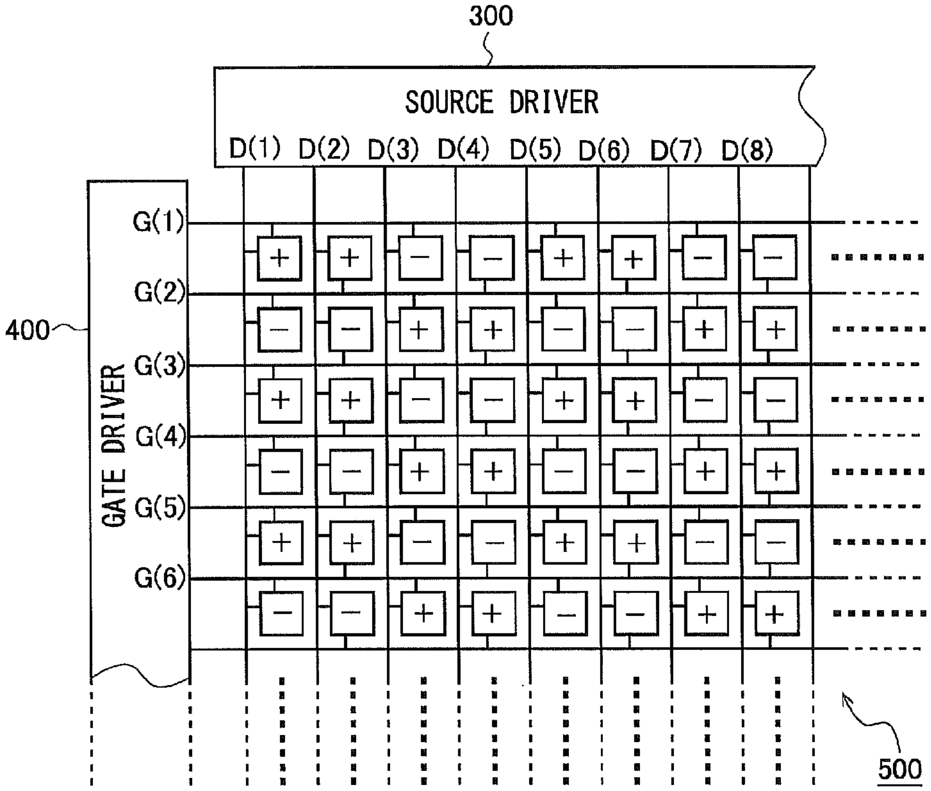
FIG. 10 is a diagram describing the distribution of pixel electrode polarities in the embodiment.

FIG. 10 is a diagram describing the polarity of the pixel electrode in each pixel forming portion where the two-dot inversion drive method is employed. As shown in FIG. 10, in the present embodiment, two adjacent pixel forming portions whose pixel electrode potentials have the same polarity are paired (referred to below as a “first pair”), and the pixel electrode potentials of two pixel forming portions in a pair (referred to below as a “second pair”) adjacent to the first pair are in opposite polarity to the first pair. Moreover, referring to FIG. 10, the first and second pairs are alternatingly provided, and from this, it can be appreciated that the two-dot inversion drive method is employed.

In the case where the two-dot inversion drive is performed, as in the case where the dot inversion drive is performed, the configuration in which the load on the source driver 300 is lessened by changing the common potential Vcom cannot be employed here. Accordingly, there is more need to lessen the load on the source driver 300 than in the case of the line inversion drive. Note that although the cycle of polarity inversion is lengthened, it is possible to employ a two-dot inversion drive method in which polarity inversion occurs every unit period of two or more frames.

Here, the liquid crystal display of the present embodiment is configured so as to be capable of providing stereoscopic display that can be seen with the naked eye, in addition to providing normal display as in the first through third embodiments. Specifically, the display portion 500 is provided at the front with an unillustrated switching liquid crystal panel for creating an optical parallax barrier, and the switching liquid crystal panel controls the direction in which light from the display portion 500 travels, thereby splitting the light so that different patterns of light reach the left and right eyes. The configuration of a liquid crystal display device employing such a parallax barrier mode is well-known, and therefore any detailed description of its configuration and operation will be omitted.

When such a liquid crystal display device provides stereoscopic display, patterns of display (light) from adjacent pixel forming portions reach different eyes, so that the display portion 500 displays a left-eye image and a right-eye image every different pixel (i.e., they are displayed alternatingly pixel by pixel). Accordingly, in the case where the dot inversion drive is performed, the pixel electrode potential of the pixel forming portion for right-eye image formation and the pixel electrode potential of the pixel forming portion for left-eye image formation are different in potential, providing an unnatural sense such as different brightness between the left-eye and right-eye images. Therefore, to prevent such an unnatural sense from being caused, the two-dot inversion drive method is employed here.

In the case where stereoscopic display is provided in the present embodiment, the potential propagation lines PVID1 and PVID2 are coupled as a pair, and the potential propagation lines PVID3 and PVID4 are coupled as another pair, such that the lines in the same pair are equal in polarity, and lines from different pairs are in opposite polarity; the potential propagation lines PVID1 to PVID4 are driven by the capacitance drive circuit 120 such that their potentials change in the same directions in which the potentials of the video signal lines SL(1) to SL(M) change.

Furthermore, in the case where normal display is provided in the present embodiment, as in the third embodiment, to achieve the same function as that of the potential propagation line PVID1 in the third embodiment, the potential propagation lines PVID1 and PVID3 are coupled as a pair, and to achieve the same function as that of the potential propagation line PVID2 in the third embodiment, the potential propagation lines PVID2 and PVID4 are coupled as another pair, such that the lines in the same pair are equal in polarity, and lines from different pairs are in opposite polarity; the potential propagation lines PVID1 to PVID4 are driven by the capacitance drive circuit 120 such that their potentials change in the same directions in which the potentials of the video signal lines SL(1) to SL(M) change.

In this manner, the present liquid crystal display device employs and switches between the two-dot inversion drive method and the dot inversion drive method, and in this configuration also, it is possible to achieve a similar effect to the aforementioned effect of changing potentials in the precharge operation, without charging the video signal lines unlike in the precharge operation.

<4.2 Effects of the Fourth Embodiment>

As described above, in the present embodiment, even in the case where the dot inversion drive method and the two-dot inversion drive method are employed and switched therebetween, the potentials of the potential propagation lines PVID1 to PVID4 are appropriately set so as to change in the same directions in which the potentials of the video signals S(1) to S(M) vary, thereby causing the potentials of video signal lines to approximate to their prescribed potentials in a short period of time. Moreover, as in the first embodiment, it is possible to achieve the effect of reducing power consumption, the effect of reducing production cost, the effect of suppressing reduction in yield rate caused by TFTs, and the effect of achieving a liquid crystal panel with a narrow frame area and low power consumption.

<5. Variant>

In the second embodiment, the second coupling capacitive elements Cp2(1) to Cp2(M) are additionally provided to the configuration of the first embodiment, but the second coupling capacitive elements Cp2(1) to Cp2(M) or a larger number of coupling capacitive elements may be additionally provided to the third or fourth configuration.

Furthermore, in the above embodiments, the coupling capacitive elements Cp(1) to Cp(M) or the second coupling capacitive elements Cp2(1) to Cp2(M) have been described as each being a single capacitive element, but each of them may consist of a plurality of coupling capacitive elements.

Furthermore, in the above embodiments, the number of potential propagation lines is one, two, or four, but another number of potential propagation lines may be provided in accordance with the mode of drive.

Furthermore, the above embodiments have been described with respect to the examples of display devices using liquid crystal elements, but the present invention can be applied as well to display devices using LEDs (light emitting diodes) such as organic EL (electro luminescence) elements or other display devices, so long as they are active-matrix display devices that provide display by changing the potentials of video signal lines with predetermined capacitance.

INDUSTRIAL APPLICABILITY

The present invention is applied to display devices such as active-matrix liquid crystal display devices, and is specifically suitable for high-resolution display devices to which enough time to perform a precharge operation is not given.

DESCRIPTION OF THE REFERENCE CHARACTERS

10 TFT (switching element)
100, 110, 120 capacitance drive circuit
200 display control circuit
300 source driver
400 gate driver
500 display portion
DAT display data signal (image signal)
DV digital image signal
CS capacitance potential control signal
Clc liquid crystal capacitance (pixel capacitance)
Ccs auxiliary capacitance
Ecom common electrode
Vcom common potential
Epix pixel electrode
GL(n) scanning signal line (n=1 to N)
SL(m) data line (m=1 to M)
Cp(m), Cp2(*m*) coupling capacitance (m=1 to M)
P(n,m) pixel forming portion (n=1 to N, m=1 to M)
PVID1 to PVID4 potential propagation line (potential propagation signal)

The invention claimed is:

1. An active-matrix display device with a plurality of pixel forming portions for forming an image to be displayed,
- a plurality of video signal lines for transmitting a plurality of video signals representing the image to be displayed to the pixel forming portions, and a plurality of scanning signal lines crossing the video signal lines, the pixel forming portions being arranged in a matrix so as to correspond to the video signal lines and the scanning signal lines, the device comprising:
- a scanning signal line drive circuit for selectively driving the scanning signal lines respectively;
- a video signal line drive circuit for applying video signals to the video signal lines by which the signals are to be transmitted, with their polarities being inverted every predetermined unit of period;

a plurality of coupling capacitances connected at their first ends to the video signal lines; and a capacitance drive circuit for changing potentials at second ends of the coupling capacitances that are opposite to the first ends connected to the video signal lines respectively, in the same directions in which potentials of the video signal lines change when the video signals are transmitted; wherein the video signal line drive circuit is switchable between first and second drive modes, and applies the video signals to the video signal lines respectively such that, in the first drive mode, video signals transmitted by any two adjacent video signal lines differ in polarity during any period in which anyone of the scanning signal lines is selected, and in the second drive mode, video signals transmitted by any two adjacent pairs of adjacent video signal lines differ in polarity during any period in which any one of the scanning signal lines is selected, and the capacitance drive circuit is switchable between a third drive mode corresponding to the first drive mode and a fourth drive mode corresponding to the second drive mode, such that, in the third drive mode, potentials at the second ends of the coupling capacitances connected to the two adjacent video signal lines respectively change in different directions in correlation with the connected video signal lines, and in the fourth drive mode, potentials at the second ends of the coupling capacitances connected to the two adjacent pairs of video signal lines change respectively in different directions in correlation with the connected video signal lines.

2. The display device according to claim 1, wherein, the video signal line drive circuit applies the video signals to the video signal lines respectively such that the video signals transmitted by the video signal lines are equal in polarity during any period in which any one of the scanning signal lines is selected, and the capacitance drive circuit changes the potentials at the second ends of the coupling capacitances in the same direction.

3. The display device according to claim 1, wherein, the video signal line drive circuit applies the video signals to the video signal lines respectively such that video signals transmitted by any two adjacent video signal lines differ in polarity during any period in which any one of the scanning signal lines is selected, and the capacitance drive circuit causes potentials at the second ends of coupling capacitances connected to the two adjacent video signal lines respectively to change in different directions respectively in correlation with the connected video signal lines.

4. The display device according to claim 1, wherein the coupling capacitances are connected near the both ends of the video signal lines.

5. A display method for an active-matrix display device with a plurality of pixel forming portions for forming an image to be displayed, a plurality of video signal lines for transmitting a plurality of video signals representing the image to be displayed to the pixel forming portions, a plurality of scanning signal lines crossing the video signal lines, and a plurality of coupling capacitances connected at their first ends to the video signal lines respectively, the pixel forming portions being arranged in a matrix so as to correspond to the video signal lines and the scanning signal lines, the method comprising:

a scanning signal line drive step of selectively driving the scanning signal lines;

a video signal line drive step of applying video signals to the video signal lines by which the signals are to be transmitted, with their polarities being inverted every predetermined unit of period; and a capacitance drive step of changing potentials at second ends of the coupling capacitances that are opposite to the first ends connected to the video signal lines respectively, in the same directions in which potentials of the video signal lines change when the video signals are transmitted; wherein the video signal line drive circuit is switchable between first and second drive modes, and applies the video signals to the video signal lines respectively such that, in the first drive mode, video signals transmitted by any two adjacent video signal lines differ in polarity during any period in which any one of the scanning signal lines is selected, and in the second drive mode, video signals transmitted by any two adjacent pairs of adjacent video signal lines differ in polarity during any period in which any one of the scanning signal lines is selected, and the capacitance drive circuit is switchable between a third drive mode corresponding to the first drive mode and a fourth drive mode corresponding to the second drive mode such that, in the third drive mode, potentials at the second ends of the coupling capacitances connected to the two adjacent video signal lines respectively change in different directions in correlation with the connected video signal lines, and in the fourth drive mode, potentials at the second ends of the coupling capacitances connected to the two adjacent pairs of video signal lines change respectively in different directions respectively in correlation with the connected video signal lines.

* * * * *